March 20, 1962 R. E. PHELON ETAL 3,026,075
CHRISTMAS TREE STAND
Filed April 5, 1960 2 Sheets-Sheet 1
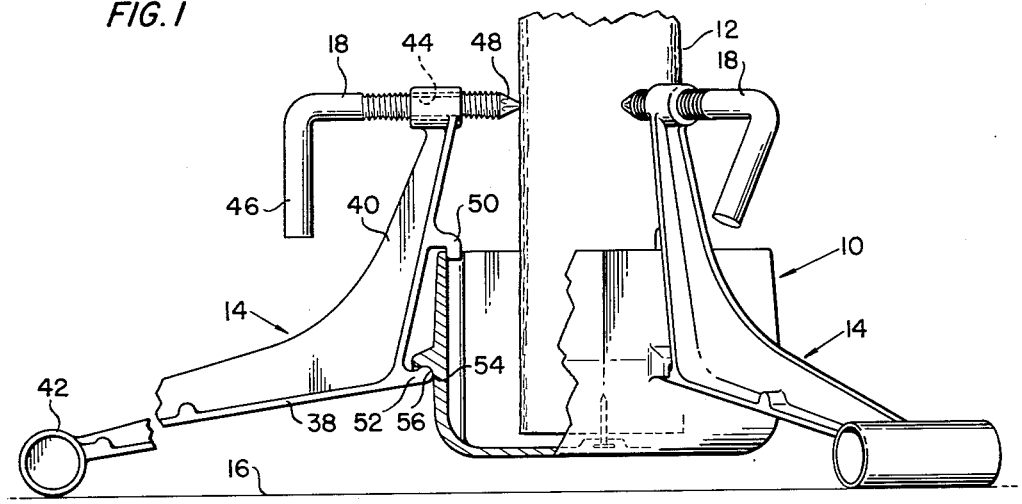
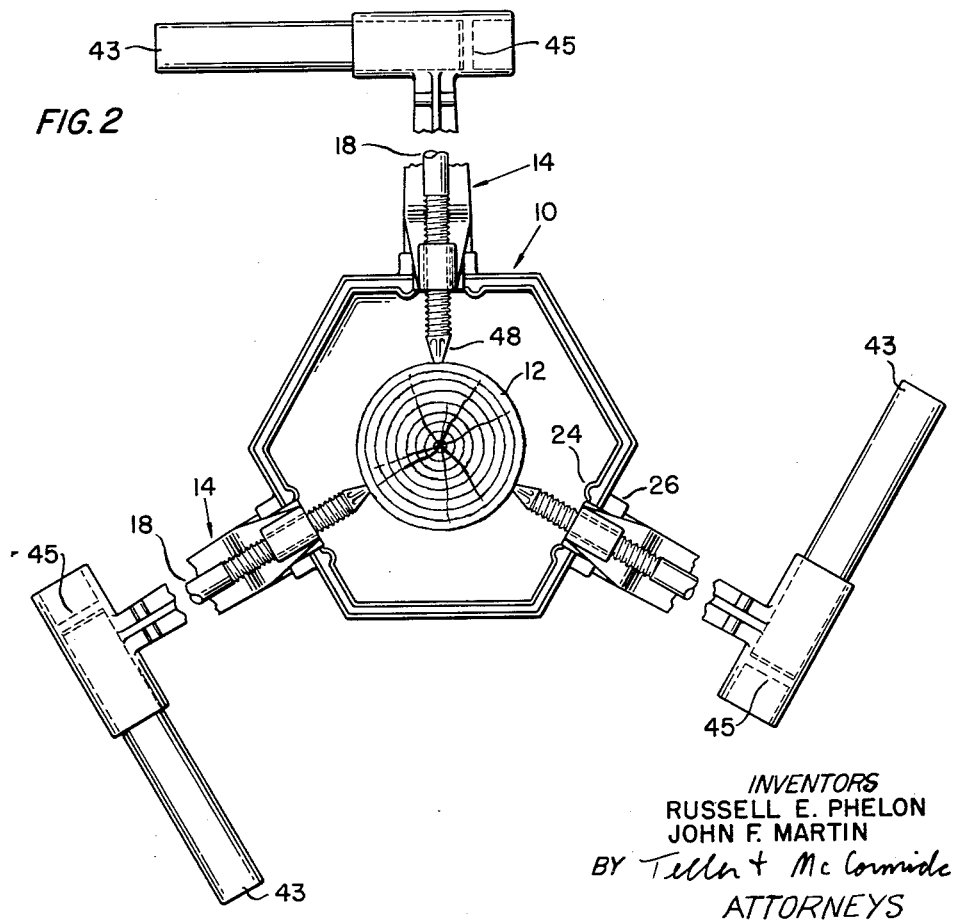
INVENTORS
RUSSELL E. PHELON
JOHN F. MARTIN
BY Teller + McCormick
ATTORNEYS March 20, 1962 R. E. PHELON ETAL 3,026,075
CHRISTMAS TREE STAND
Filed April 5, 1960 2 Sheets-Sheet 2

INVENTORS
RUSSELL E. PHELON
JOHN F. MARTIN
BY *Teller & McCormick*
ATTORNEYS

United States Patent Office 3,026,075
Patented Mar. 20, 1962

3,026,075
CHRISTMAS TREE STAND
Russell E. Phelon, Longmeadow, and John F. Martin, East Longmeadow, Mass., assignors to Phelon Magnagrip Company, Inc., East Longmeadow, Mass., a corporation of Massachusetts
Filed Apr. 5, 1960, Ser. No. 20,050
2 Claims. (Cl. 248—48)

This invention relates to Christmas tree stands of the type which include a generally cup-shaped member for receiving the base portion of the tree trunk and which also include a plurality of legs adapted to be attached to the cup-shaped member when the stand is in use, but which may readily be detached from the member for convenient and space-saving storage of the stand.

It is the general object of the present invention to provide an improved Christmas tree stand of the above-referred to type which is adapted to provide for a more secure connection between the cup-shaped member and the legs than has heretofore been obtainable, and which is particularly well suited to trees having irregular trunks and capable of supporting such trees with their trunk center lines precisely vertical.

A more specific object of the invention is to provide a tree stand of the type referred to wherein each of the plurality of legs carries an adjustable tree engaging and holding member which serves also to exert a reactive force on the leg to effect secure attachment of the leg to the cup-shaped member.

The drawings show a preferred embodiment of the invention and such embodiment will be described, but it will be understood that various changes may be made from the construction disclosed, and that the drawings and description are not to be construed as defining or limiting the scope of the invention, the claims forming a part of this specification being relied upon for that purpose.

Of the drawings:

FIG. 1 is a side elevational view partially in section of an assembled tree stand comprising a cup and attached legs and which embodies the present invention.

FIG. 2 is a top view of the tree stand of FIG. 1 showing stabilizing elements associated with the legs thereof.

Figure 3:
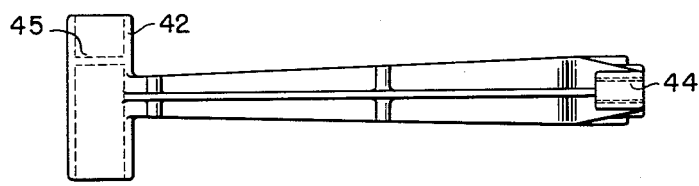
FIG. 3 is a top view of one of the legs of the tree stand shown in FIG. 1.

Referring to FIG. 1, it will be observed that the tree stand shown therein comprises an upright cup indicated generally at 10. The cup 10 is adapted to receive the base portion of a tree trunk 12 and has attached thereto a plurality of legs indicated generally by the reference numerals 14, 14. The legs 14, 14 are adapted to be readily detached from the cup for convenient storage and, in accordance with the invention, at least three such legs are spaced angularly around the cup. In the preferred embodiment of the invention shown, three legs 14 are provided and they serve to support the cup 10 in spaced relation with a floor or other base surface 16. Each of the legs 14 carries an adjustable tree engaging and holding member, shown as a bolt 18 and, as will be seen, said members or bolts serve upon tree engagement to exert a reactive force on their respective legs to effect secure attachment of the legs to the cup.

Figure 4:
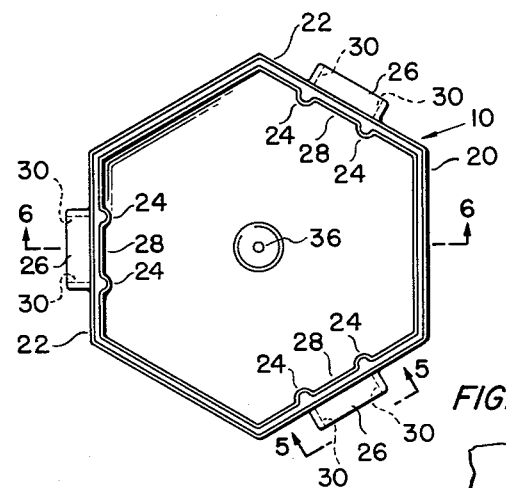
FIG. 4 is a top view of the cup of the tree stand of FIG. 1.
Figure 5:
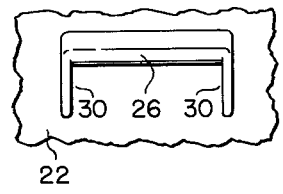
FIG. 5 is a side view of one of a plurality of flanges on the cup taken as indicated by the line 5—5 in FIG. 4.
Figure 6:
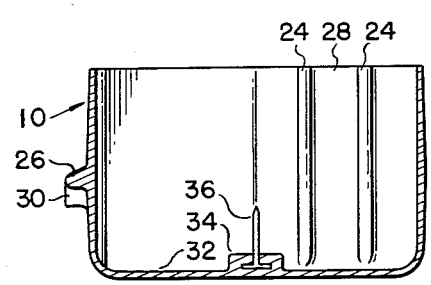
FIG. 6 is a vertical section approximately through the center of the cup of FIG. 4.

As shown, the cup 10 has a substantially vertical side wall 20 which is hexagonal when viewed from above (FIGS. 2 and 4). The legs 14, 14 are adapted to be detachably connected respectively to alternate portions 22, 22 of the side wall 20 and each of said alternate wall portions is preferably provided with means for preventing movement of its corresponding leg along or parallel to the upper edge of the side wall 20. As best shown in FIGS. 2, 3, 4 and 5, the means on the wall portions 22, 22 which prevent leg movement comprise a pair of spaced parallel and inwardly projecting vertical ribs 24, 24 and an outwardly projecting U-shaped flange 26 which opens outwardly and downwardly. The ribs 24, 24, as shown, extend substantially throughout the height of the inner surface of their respective wall portions and define vertical grooves 28, 28 which open inwardly and which are open at the top adjacent the upper edge of their respective wall portions. The flanges 26, 26 project from the outer surfaces of their respective wall portions substantially below the upper edges of said wall portions and their side walls have inner surfaces 30, 30 (FIG. 5) which are spaced apart a distance substantially equal to the distance between the ribs 24, 24 of each pair of ribs. The vertical center line of each flange 26 lies in a plane which is normal to the corresponding wall portion 22 and which includes the vertical center line of the corresponding groove 28 formed by the ribs 24, 24.

The cup 10 also includes a base wall 32 which may be formed integrally with the side wall 20 thereof and which preferably cooperates with the said side wall to provide a watertight receptacle. An upstanding button 34 at the center of the base wall 32 holds an upright pin 36 which has a sharp point at its upper end adapted to be entered in the base portion of a tree trunk to locate and hold the same.

As best shown in FIG. 1, each of the legs 14, 14 is generally L-shaped in the preferred form. Each of said legs has a floor engaging end portion 38 and an opposite end portion 40, said opposite end portion being disposed above the upper edge of the side wall 20 of the cup 10 and adjacent a tree trunk supported in the cup when the leg is connected thereto. Preferably and as shown, the floor engaging end portion 38 of each leg 14 includes an integral transversely extending member, such as the tubular member 42 shown, which provides increased floor engaging surface and which is adapted to receive and hold an elongated cylindrical stabilizing element 43 (FIG. 2). A radial wall 45 within each tubular member 42 engages and locates the end of the associated stabilizing element 43 which element provides additional floor engaging surface and which may comprise a wood dowel or the like supplied by the purchaser and shimmed upwardly at its free end. The tree stand will obviously exhibit a high degree of stability in use with the stabilizing elements or dowels 43, 43 entered in the tubular members 42, 42, but may be reduced to a compact size for storage with the dowels removed from the tubular members and the legs detached from the cup 10.

In the embodiment of the invention shown, the opposite end portion 40 of each leg 14 has a threaded opening 44 therein which extends radially with respect to a tree trunk in the cup 10 and which is adapted to receive the aforementioned bolt 18. As shown, each of the bolts 18 is generally L-shaped and has an arm or handle 46 for convenient manual rotation of the bolt. It will be obvious that the said arm or handle 46 may be rotated to move the inner end 48 of the bolt, which is preferably pointed as shown, into and out of engagement with the tree trunk. It will also be obvious that each bolt 18, when engaged with the tree trunk, will serve to exert a generally outwardly directed reactive force on the opposite end portion 40 of the corresponding leg 14.

In accordance with the present invention, each of the legs 14 is provided at an intermediate portion with a means adapted to be disposed adjacent an inwardly facing surface of the cup 10. The said means is urged into engagement with said inwardly facing cup surface by engagement of the bolt on the leg with the tree trunk whereby to secure the leg to the cup. In the preferred embodiment of the invention shown, the said cup engaging means comprises a downwardly open hook 50 formed integrally on the leg below its opposite or upper end portion 40 and below its bolt 18. The hook 50 fits loosely over the upper edge of the side wall 20 of the cup 10 and projects downwardly adjacent the inner or inwardly facing surface of said wall. When the cup 10 is constructed as shown and has a vertical hexagonal side wall 20 with ribs 24, 24 and flanges 26 provided on alternate portions 22, 22 thereof, the legs 14, 14 are attached to said alternate wall portions and the hooks 50, 50 on the legs are entered respectively in the grooves 28, 28 between the ribs 24, 24. The width of the hooks 50, 50 is such that they substantially engage the ribs 24, 24 so as to be secured against movement along the upper edges of the wall portions 22, 22.

In further accord with the present invention, each of the legs 14, 14 has an inwardly facing surface thereon below its hook 50 and said surface is disposed adjacent an outwardly facing surface on the cup 10 when the leg is attached to the cup. As shown, each of the legs 14, 14 is provided with an inwardly projecting lug 52 which has an inwardly facing surface 54 at its inner end. The surface 54 lies adjacent an outwardly facing surface 56 on the side wall 20 of the cup 10. When the side wall 20 is hexagonal as shown and has the V-shaped flanges 26, 26 on alternate portions thereof, the lugs 52, 52 are entered between and substantially in engagement with the aforementioned inner surfaces 30, 30 of the flange side walls. Thus, the lugs 52, 52 are secured against movement parallel with the upper edge of the side wall 20 of the cup.

From the foregoing, it will be apparent that the hook 50 on each leg 14 serves as a pivot means whereby the reactive force exerted on the leg by its bolt 18 tends to pivot the leg to urge the inwardly facing surface 54 on the lug 52 into engagement with the adjacent outwardly facing wall surface 54. The inwardly facing surface of the side wall 20 adjacent the hook 50 is firmly engaged by the hook and the leg is thus securely clamped to the cup 10. It will be further apparent that retraction of the bolt 18 from engagement with the tree trunk will result in a loss of the aforementioned reactive force and release of the clamping action of the leg on the cup. Thus, the legs 14, 14 can be clamped securely to the cup 10 when the tree stand is in use and readily detached therefrom for convenient and space-saving storage.

In connection with the attachment of the legs 14, 14 to the cup 10 and with the support of a tree trunk in the stand, it is to be observed that the stand is particularly well suited to trees having irregular trunks. That is, the bolts 18, 18 may be secured in different positions relative to the end portions 40, 40 of their respective legs to accommodate an irregular tree trunk. Irrespective of the position of a bolt 18 relative to the end portion 40 of its leg 14, the aforementioned reactive force which effects clamping of the leg to the cup is provided. Further, no difference need exist in the position of the legs 14, 14 relative to the cup to permit secure clamping of the legs thereto when an irregular tree trunk is encountered. The floor engaging end portions 38, 38 of the legs 14, 14 and the tubular elements 42, 42, as well as the dowels 43, 43, always lie in a common horizontal plane and the tree trunk can be held with its center line precisely vertical.

The invention claimed is:

1. In a Christmas tree stand, the combination of an upright cup with a substantially vertical side wall adapted to receive and support the base portion of a tree trunk, the side wall of said cup being hexagonal in shape when viewed from above and alternate portions thereof each being provided with a spaced parallel pair of inwardly projecting vertical ribs and with an outwardly projecting flange which is generally U-shaped in vertical cross section and which is open outwardly and downwardly, three similar generally L-shaped legs detachably connected respectively to the alternate portions of the side wall of said cup, each of said legs having a floor engaging end portion and an opposite end portion with a threaded opening therein which is disposed above the upper edge of said side wall and adjacent the tree trunk, an integral downwardly open hook on each of said legs below said opposite end thereof which fits loosely over the upper edge of the corresponding wall portion of the cup and projects downwardly adjacent the inner surface of said wall portion between and substantially in engagement with the ribs thereon, an integral inwardly projecting lug on each of said legs below the hook thereon and which is entered between and substantially in engagement with the inner surfaces of the side walls of the flange on the corresponding portion of the side wall of the cup, and a tree trunk engaging and holding bolt entered in said threaded opening in said opposite end portion of each leg, said bolt being rotatable manually for movement into and out of engagement with the tree trunk and serving upon tree engagement to exert an outwardly directed reactive force on said opposite end portion of said leg whereby to urge said hook into engagement with the adjacent inner surface of the side wall of said cup and to pivot said leg about said hook to engage the lug thereon with the adjacent outwardly facing surface of the side wall of the cup so as to clamp the leg to the cup.

2. A Christmas tree stand as set forth in claim 1 wherein the floor engaging end portion of each leg includes an integrally formed and transversely extending tubular member adapted to receive and hold an elongated cylindrical stabilizing element which provides additional floor engaging surface.

References Cited in the file of this patent

UNITED STATES PATENTS

| | | |
|---|---|---|
| 1,776,109 | Dina | Sept. 16, 1930 |
| 2,237,513 | Timko | April 8, 1941 |
| 2,485,819 | Doebling | Oct. 25, 1949 |
| 2,837,305 | Andren | June 3, 1958 |